United States Patent [19]

Yoshida et al.

[11] 4,272,651
[45] Jun. 9, 1981

[54] OPTICAL SYSTEM HAVING DIODE LASER LIGHT SOURCE

[75] Inventors: Tomio Yoshida, Katano; Yoshinobu Nakata, Ikoma; Shunji Harigae, Neyagawa; Toshio Sato, Moriguchi, all of Japan

[73] Assignee: Matsushita Electric Industrial Co., Ltd., Japan

[21] Appl. No.: 33,005

[22] Filed: Apr. 24, 1979

[30] Foreign Application Priority Data

Apr. 28, 1978 [JP] Japan .................................. 53-51807
Aug. 25, 1978 [JP] Japan ................................ 53-104081

[51] Int. Cl.³ ............................................. G11B 7/00
[52] U.S. Cl. ..................................... 369/112; 369/122
[58] Field of Search ................. 358/128, 128.5, 128.6; 179/100.1 G, 100.3 V, 100.3 N, 100.3 Z

[56] References Cited

U.S. PATENT DOCUMENTS

| | | | |
|---|---|---|---|
| 3,396,344 | 8/1968 | Broom | 179/100.3 Z |
| 3,983,317 | 9/1976 | Glorioso | 179/100.3 V |
| 4,125,859 | 11/1978 | Oshida et al. | 358/128 |

*Primary Examiner*—Daryl W. Cook
*Assistant Examiner*—Donald McElheny, Jr.
*Attorney, Agent, or Firm*—Stevens, Davis, Miller & Mosher

[57] ABSTRACT

An optical system for an optical data recording and reproducing apparatus such as an optical video disc apparatus comprising a diode laser light source, a condenser lens disposed adjacent to the diode laser, a cylindrical lens assembly arranged to exhibit different magnifications to light beams emitted by the diode laser in the direction perpendicular to a junction plane thereof and in the direction parallel to the junction plane, and a concentrating lens for constricting the resulting light beam into a light spot of a small size for projection on a recording medium. Recording of information is attained by the constricted light beam of a substantially circular cross-section with a high recording density at a low energy consumption. When reproducing the recorded information, the constricted beam is laterally enlarged in the transverse direction of the information recording track thereby to assure generation of a signal utilized for tracking control.

3 Claims, 11 Drawing Figures

OPTICAL SYSTEM HAVING DIODE LASER LIGHT SOURCE

BACKGROUND OF THE INVENTION

1. Field of the Invention

The present invention relates to an optical device using a diode laser as a light source and in particular concerns an optical system which can be applied to an apparatus for recording and/or reproducing optical information, video or audio or both, on or from an optical recording medium formed on a disc with a high density by means of a small size spot of a concentrated laser light beam produced by a diode laser. For example the invention is applicable to an optical video disc apparatus.

2. Description of the Prior Art

In general, the semiconductor laser has advantageous features in that the laser beam can be directly modulated without the need for using an optical modulator and the laser device can be implemented in a highly miniaturized size as compared with other lasers. Thus, the semiconductor laser is increasingly employed in various instruments and apparatus as a light source. When the diode laser is to be used as the light source for an optical recording and reproducing apparatus, it must be capable of producing an output light beam having a reasonably high energy level in correspondence with the optical sensitivity of a recording material. For example, where the recording material is a layer of silver salt deposited on a film and thus necessarily subjected to developing and fixing treatments after exposure to a recording illumination, the output power of the semiconductor laser may be relatively low. However, for a recording medium such as metallic thin film or pigment film, recording energy level in the range of 100 to 1000 $mJ/cm^2$ is required as measured on the recording medium. Thus, the output power of the semiconductor laser used as the light source has to be on the order of several tens of milliwatts. In order to assure the recording energy level of the magnitude described above on the recording medium, it is desirable that light transfer efficiency should be increased as much as possible in the optical path extending between the diode laser and the recording medium by concentrating the laser beam so as to produce a fine or minute light spot on the recording medium. In this connection, it is noted that the output beam of a diode laser has inherently a relatively large diameter. Thus, concentration or focusing of the laser beam to a diameter as small as possible is required for fulfilling the requirements of concerning the recording energy level described above and at the same time for attaining the recording of a signal at a possibly increased density.

The cross-sectional shape of the light beam at the light emitting plane of a diode laser exhibiting a high output power is related to a plane of a junction of the diode laser and takes an extremely elongated profile having dimensions of several $\mu m$ in the direction perpendicular to the junction plane and several tens $\mu m$ in the direction parallel to the junction plane. Further, the light beam emitted from the light emitting plane exhibits a relatively large angular extension, e.g. angular extension of $\pm 15°$ to $20°$ in the direction perpendicular to the junction plane and $\pm 5°$ to $10°$ in the direction parallel thereto. Consequently, the semiconductor laser has to be handled in a completely different manner as compared with He—Ne gas lasers or the like.

SUMMARY OF THE INVENTION

An object of the invention is to provide an optical system for concentrating or focusing a laser light beam of a diode laser having an elongated rectanglar light emitting plane to a circular light spot of very small size.

Another object of the invention is to provide an optical system which is capable of producing light spots of different profiles focused on a recording medium for the recording and reproducing operations, respectively.

A hitherto known optical type video disc apparatus usually comprises conventional focal point control means for maintaining a constant distance between a focusing lens system for concentrating a laser light beam to a very small spot and the recording disc, to thereby always project a constant size light beam, and conventional tracking control means for allowing the light beam to trace precisely a data or information track. In general, the control signal utilized for the tracking control is produced by an electric circuit which includes a photo-electrical transducer element adapted to receive a light beam reflected from or transmitted through the recording disc and means for receiving the output signal from the photo-electrical transducer element to thereby produce an appropriate electrical signal. In order to assure an enhanced reliability of the tracking control, a light spot of a large size must be used for the reproducing or playback operation as compared with that for the recording operation. Such conception is disclosed in Japanese Patent Laid-Open Publication No. 74306/77 (Japanese Patent Application No. 151447/75). According to the prior art, the distance between the focusing lens and the recording disc is changed for the recording and the reproduction thereby to enlarge the reading light beam in the transverse direction of the information track. However, because the reading light spot is simultaneously enlarged in size in the longitudinal direction of the information track, there arises a disadvantage that reproduction quality is undesirably degraded particularly for information or data recorded in a short wavelength region.

Accordingly, an object of the invention is to provide an optical system which enlarges the reading light spot on a recording medium only in the transverse direction of the information track while inhibiting expansion in the longitudinal direction of the track for a reproducing or playback operation.

Another object of the invention is to obtain an improved tracking signal in the reproducing mode by providing an optical system having a reading light spot on the recording medium enlarged only in the transverse direction of the information track during reproduction.

Yet another object of the invention is to provide an optical system for concentrating the light emitted from the rectangular junction plane of a laser diode to a circular light spot of minute diameter.

The above and other objects, features and advantages of the invention will become more apparent from the following description of exemplary embodiments of the invention taken in conjunction with the accompanying drawings.

DETAILED DESCRIPTION OF THE PREFERRED EMBODIMENTS

Figure 1:
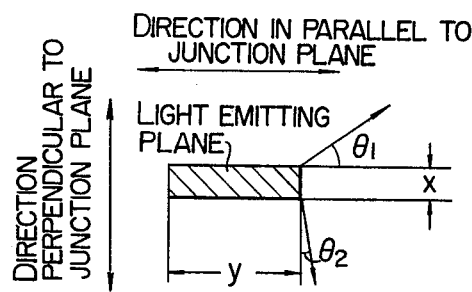
FIG. 1 illustrates schematically a light emitting plane of a semiconductor laser.

In FIG. 1, there is illustrated a typical shape of a light emitting plane of a diode laser of a double-hetero structure. In order to attain output power of a reasonably high energy level in a single transverse mode, or with single mode in transverse mode, in a continuous oscillation, it is generally preferred in practice that the light emitting plane of the diode laser is configured in a rectangular form so as to have a certain area as is illustrated in FIG. 1. In this figure, symbol x represents a dimension of a side of the rectangle in the direction perpendicular to the junction plane of the laser device, while y represents the dimension of another side of the rectangle in the direction parallel to the junction plane. It is noted that the light beam emitted from the rectangular light emitting plane exhibits a remarkably large angular extension due to a diffraction effect as compared with gas lasers or the like. For typical dimensional values, the spreading angle $\theta_1$ in the direction perpendicular to the junction plane is equal to 20°, while the spreading angle $\theta_2$ in the direction parallel to the junction plane is equal to 5° on the assumption that x=2 $\mu$m and y=13 $\mu$m.

Figure 2:
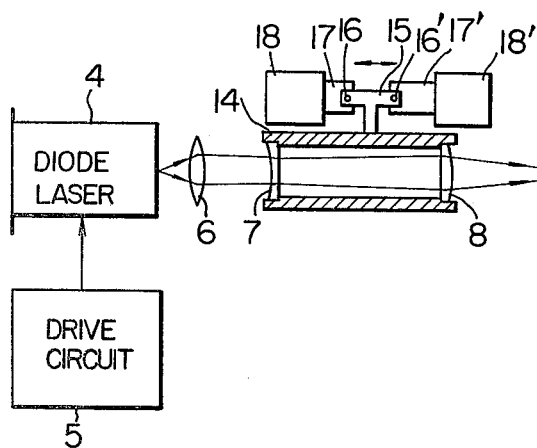
FIG. 2 shows schematically a general arrangement of an optical system according to an embodiment of the invention.
Figure 2:
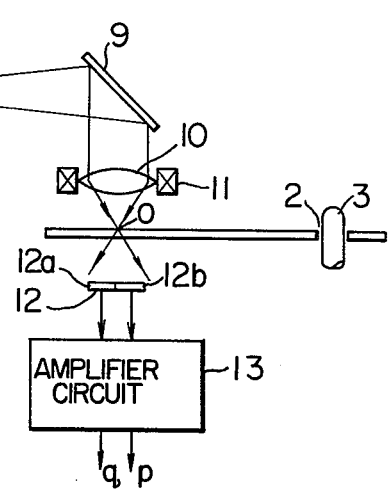

FIG. 2 shows a general arrangement of an optical system according to an exemplary embodiment of the invention which includes a diode laser of a configuration shown in FIG. 1. In the optical system shown in FIG. 2 which is destined to be used for a laser ray emitted in the direction parallel to the junction plane of the diode laser, a disc having a recording surface of an optical recording material is mounted on a rotatable shaft 3 inserted fixedly through a through-hole 2 and adapted to be driven by an electric motor (not shown). Reference numeral 4 denotes the diode laser coupled to a control and drive circuit 5 which is adapted to modulate the light output of the diode laser in accordance with the information or data signals to be recorded and reduce controllably the intensity of the reading laser beam so that the property of the recording material deposited over the disc 1 may not be changed by the laser beam when the recorded information or data is to be read out for reproduction. A condenser lens 6 which may be constituted by an objective lens as used in a microscope or the like is disposed adjacent to the diode laser for focusing or concentrating the light beam having the remarkable angular extension unique to the diode laser, as described hereinbefore. A concave cylindrical lens 7 and a convex cylindrical lens 8 are disposed in alignment with the condenser lens 6 in such orientation that the maximum curvatures of the lenses 7 and 8 are presented in the direction parallel to the junction plane of the diode laser. A total reflection mirror 9 is disposed to deflect the output laser ray toward the disc 1 and is imparted with a tracking function for allowing the laser light beam to trace the information track for the reproducing operation. Numeral 10 denotes a focusing lens which may be constituted by an objective lens of a microscope quality and has a function to focus or concentrate the laser beam reflected from the mirror 9 to form a light spot of a minute size on the recording disc surface at a point indicated by 0. The focusing or concentrating lens 10 is held and supported by a focal distance adjusting member 11 which is known per se and may be constituted by a voice coil of a loudspeaker. The focal distance adjusting member 11 serves to support the concentrating lens 10 movably along the optical axis to compensate for any variations or change in the distance between the lens 10 and the recording surface of the disc 1 due to possible shaking or oscillation of the surface of the disk 1. To this end, an electric signal for controlling the focal distance adjusting member 11 is derived from the output of a photo-electric converter element adapted to receive the light ray reflected from or transmitted through the disc to produce a corresponding electrical output signal. Alternatively, the control signal for the focal distance adjusting member 11 may be produced by detecting variations in electrostatic capacity between the disc 1 and an electrically conductive plate disposed in parallel to the disc 1 a small distance therefrom.

Reference numeral 12 denotes an photo-electric conversion device which is adapted to produce an electric signal in response to the light transmission through the disc 1. In order to detect any tracking error, the photo-electric conversion device 12 is constituted by two separate photo-electric conversion elements 12a and 12b disposed adjacent to each other, wherein the center dividing line between the elements 12a and 12b is positioned substantially in parallel to the information track formed on the disc 1. The outputs from the conversion elements 12a and 12b are coupled to an amplifier circuit 13 which is adapted to produce signals representing a sum and a difference of the outputs from the elements 12a and 12b. The sum signal appears at the output terminal P and represents the information reproduced from the disc 1 under illumination by the reading light beam. On the other hand, the difference signal appearing at the output terminal q represents positional deviation of the reading light spot on the disc 1 from the concerned information track. In other words, the difference signal q represents the tracking error.

The cylindrical lenses 7 and 8 are supported by a lens drum 14 which is supported on a base platform so as to be movable along the optical axis of the cylindrical lens system to position the cylindrical lenses at respective different locations along the optical path for the information recording operation and the information reproducing operation, respectively. To this end, plungers 17 and 17' are pivotally connected to a projection 15 formed integrally with the lens drum 14 by means of pins 16 and 16'. When either one of solenoid coils 18 and 18' associated with the plungers 17 and 17' is energized, the cylindrical lens assembly can take corresponding one of the two predetermined positions. The energization of the solenoid coils 18 and 18' may be effected through means interlocked with a recording push button and a reproducing push button (both of which are not shown).

Figure 3A:
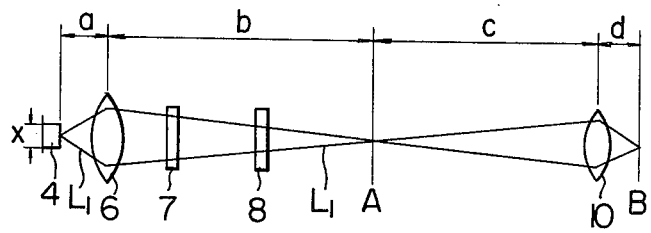
FIG. 3A shows an optical system for a light ray emitted in a direction perpendicular to the plane of the junction of a diode laser.
Figure 3B:
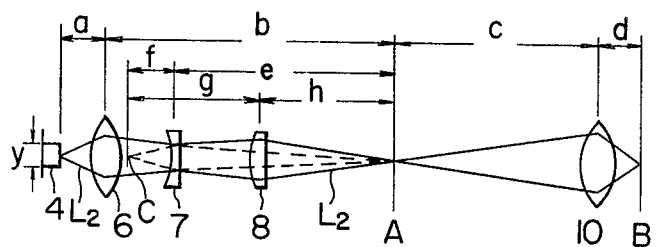
FIG. 3B shows an optical system for a light ray emitted in a direction parallel to the junction plane of the diode laser.

Description in more detail will be made on the optical system shown in FIG. 2 by referring also to FIG. 3, in which same reference numerals and symbols used in FIG. 2 denote like parts. FIG. 3A shows a portion of the optical system adapted to process the light beam emitted in the direction perpendicular to the junction plane of the semiconductor laser, while FIG. 3B shows the portion of the optical system for the light beam emitted in the direction in parallel to the junction plane of the diode laser 4. In the first place, description will be made on the arrangement of optical system which is suited for the information recording.

Referring to FIG. 3A, the light beam $L_1$ emitted by the diode laser 4 in the direction perpendicular to the junction plane thereof is focused at a point A by the condenser lens 6 with a magnification of b/a. At this time, neither the concave cylindrical lens 7 nor convex cylindrical lens 8 will exert any lens action to the light beam $L_1$. The light source image focused at the point A is then focused at a point B by the concentrating or constricting lens 10 in a constricted form with a magnification factor of d/c.

Referring to FIG. 3B, the light beam $L_2$ emitted by the diode laser in the direction in parallel to the junction plane thereof is collected by the condenser lens 6 and focused at the same point A as in the case of FIG. 3A through the cylindrical lenses 7 and 8 with a magnification factor differing from b/a, i.e. with the magnification of $b/a \times f/e \times h/g$. The point C shown in FIG. 3B corresponds to the position of image focused by the concave cylindrical lens 7.

In the case of the diode laser having an elongated rectangular light emitting area of a short side x and a long side y such as shown in FIG. 1, assuming that the magnification factor (b/a) of the condenser lens 6 is equal to M, the size of the light source image at the point A in FIG. 3A is given by $x \times M$. On the other hand, the size of the light source image at the point A in FIG. 3B can be expressed by $y \times (M \times F/e \times h/g)$. Accordingly, when the concave and convex cylindrical lenses 7 and 8 are so designed that $x \times M = y \times (M \times f/e \times h/g)$, then the image of the elongated rectangular light emitting area of the diode laser 4 at the point A can be converted to an image having a substantially square or circular form. Although the image at the point A is to be opto-geometrically in a square form on the assumption described above, the diode laser may be regarded to have an elongated ellipsoidal light emitting area in consideration of the extremely small size thereof as well as the diffraction effect. Thus, the image at the point A approximates to a circular shape.

With only one of the concave or convex cylindrical lenses 7 or 8, it is impossible to make the image points A shown in FIGS. 3A and 3B coincide with each other. For this reason, a combination of two or more cylindrical lenses has to be employed. Although a combination of the concave and the convex cylindrical lenses is used in the case of the illustrated embodiment, it will be appreciated that a combination of two convex cylindrical lenses may be used to construct an optical system similar to the illustrated one. However, in this connection, although it is possible to make the same size images both in the direction perpendicular to the junction plane and in the direction parallel to the junction plane, it is impossible to make both images lie at the same point on the light axis as shown by the point A in FIGS. 3A and 3B, and in this case the light beam has astigmatism, therefore, it is difficult to obtain the smallest image by the concentrating lens 10. Thus it is most important feature of this invention that the combination of concave and convex cylindrical lenses are used.

As a more concrete embodiment of this invention, it is further assumed that the diode laser 4 has a dimension $x = 2$ $\mu$m in the direction of thickness of the junction plane in combination with a dimension $y = 13$ $\mu$m in the direction perpendicular to the direction of thickness. When an objective lens having a magnification factor of 20 is used for the condenser lens 6, then a light source image having a size of 40 $\mu$m = 2 $\mu$m $\times$ 20 can be produced at the point A in FIG. 3A. On the other hand, when the focal length of the concave and the convex cylindrical lenses 7 and 8 shown in FIG. 3B are selected equal to $-40$ mm and $+40$ mm, respectively, with the distance between the lenses 7 and 8 being set to a corresponding value, then the magnification factor of 3 can be attained at the point A in FIG. 3B. In other words, the light source image of 39 $\mu$m = 13 $\mu$m $\times$ 3 can be produced at the point A in FIG. 3B. In this manner, an approximately square or circular image of the light source with an enlarged size of about 40 $\mu$m $\times$ 40 $\mu$m can be obtained at the point A. When this light image is focused by the concentrating lens 10 which may be constituted by an objective of a microscope having a magnification factor of 20, then a light image of 2 $\mu$m $\times$ 2 $\mu$m in size can be produced at the points B in FIGS. 3A and 3B, respectively. It will thus be appreciated that a substantially circular small light spot which is suited for optically recording or reproducing information on or from the disc 1 can be obtained even with an elongated rectangular light source. That is accomplished by varying the ratio of the longitudinal and transverse dimensions thereof by means of the concave and the convex cylindrical lenses inserted in one of the optical paths of the light source and by making the focusing positions of both lenses coincide with each other at one point on the optical axis, thereby to produce an approximately square or circular intermediate image which is then focused or concentrated onto the disc 1 in a constricted form.

In the case of the illustrated embodiment, the cylindrical lenses are disposed in the optical path at which the light beam $L_2$ emitted in the direction perpendicular to the direction of thickness at the junction of the diode laser 4 may undergo lens action of the cylindrical lenses. Although the reverse lens arrangement in which the light beam $L_1$ is subjected to the optical action by the cylindrical lenses is possible, such arrangement is not preferred because a lens having a relatively long focal distance has to be used for the condenser lens 6 in consideration of the fact that the magnification of the condenser lens 6 must be selected equal to ca. 3 so that total magnification factor of 20 can be attained in combination with the cylindrical lens assembly. It should be noted that the use of the condenser lens 6 having a long focal distance will deteriorate the light transmission efficiency of the optical system due to a large angular extension or spreading of the light beam emitted by the diode laser. Besides, the cylindrical lens needs to have a relatively short focal distance, which in turn involves a significant aberration.

Figure 4A:
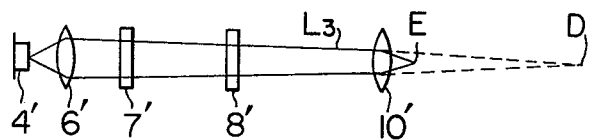
FIG. 4A shows a modification of the optical system shown in FIG. 3A.
Figure 4B:
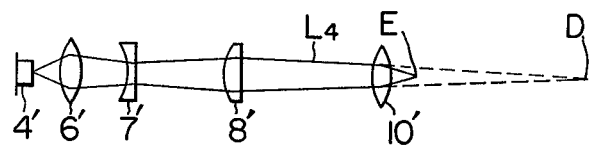
FIG. 4B shows a modification of the optical system shown in FIG. 3B.

In the case of the illustrated embodiment, the focused point of the image magnified through the condenser lens 6 and the combination of the cylindrical lenses 7 and 8 is set at a position in precedence to the concentrating or constricting lens 10. However, it is of course possible to arrange things so the focused point of the magnified light image may be located at the position shown in FIGS. 4A and 4B. In these figures, the reference numerals attached with prime and symbols which are the same as those used in FIGS. 3A and 3B denote the same parts and positions. More specifically, numeral 4' denotes a semiconductor laser, 6' denotes a condenser lens, 7' and 8' denote a concave cylindrical lens and a convex cylindrical lens, respectively, and 10' denotes a concentrating or constricting lens. Further, the symbol $L_3$, $L_4$, D and E in FIGS. 4A and 4B represent items corresponding to those represented by $L_1$, $L_2$, A and B, respectively. The light beam $L_3$ emitted in the thickness direction of the junction of the diode laser 4' is focused at the point D through the condenser lens 6' with a certain magnification and then focused at the point E in a constricted form through the concentrating or constricting lens 10'. On the other hand, the light beam $L_4$ in the direction perpendicular to the thickness direction of the junction is focused at the point D in the same size as the beam $L_3$ through the condenser lens 10' and the cylindrical lenses 7' and 8' and then focused at the point E through the concentrating or constricting lens 10'. In this manner, the lens arrangements shown in FIGS. 4A and 4B can be adopted in the optical system shown in FIG. 2 to the same effect as those shown in FIGS. 3A and 3B.

In the foregoing, optical systems for producing the minute light spot suited for optically recording information on the disc 1 has been described. Next, description will be made on the light beam focusing system used for the reproduction of the stored information.

Figure 5A:
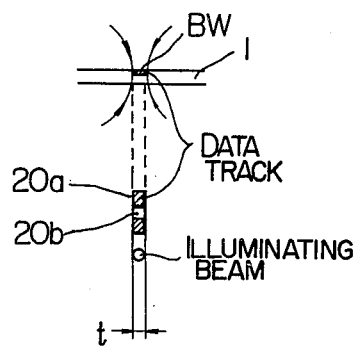
FIGS. 5A to 5C show relationships between an information track and a light beam projected thereto.
Figure 5B:
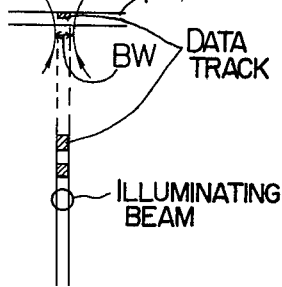
Figure 5C:
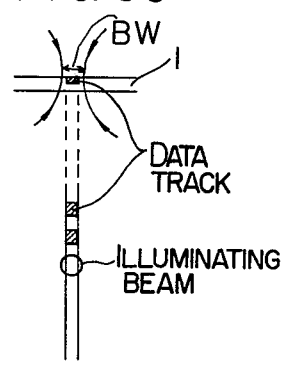

Referring to FIGS. 5A to 5C which illustrate schematically positional relationships between light beam waist (BW) constricted by the concentrating lens 10 and information recording track, reference 20a denotes a bit portion of the recording material layer formed on the upper surface of the disc 1, at which bit portion the recording material has undergone optical change due to irradiation with the light beam of a high intensity, while 20b denotes a bit portion at which the recording material has undergone no optical change because the irradiating beam is of a low intensity.

When information is recorded on the blank disc, it is more desireable that the beam waist is situated just on the recording material of disc 1, as shown in FIG. 5A, because the recording of a high frequency band can be then attained at the possibly shortest recording wavelength with minimum energy consumption.

On the other hand, when the data signal is to be reproduced from the recorded disc by using the laser beam of a reduced intensity, the data signal can be reproduced with the highest possible amplitude if the diameter of the reading light beam is substantially equal to the width t of the information or data track, as shown in FIG. 5A. However, under these conditions, the difference signal or the tracking error signal produced at the output terminal q of the amplifier circuit 13 in response to the reception of the disc transmitting light ray by the photo-electrical conversion element 12 will become unstable with the signal amplitude being remarkably decreased. This can be explained by the fact that the light ray is prevented from impinging onto the photo-electrical conversion element 12 due to the masking or shielding effect of the data track per se. Under the conditions, the reference position for the tracking control itself becomes difficult to detect. Additionally, the tracking control may eventually be made even impossible, because the phase of the difference output signal at the output terminal q is inverted when the beam waist or light spot (most constricted portion of the beam) lying slightly over the disc surface is displaced to a position below the disc surface. In this conjunction, it is to be noted that with all the focal adjustment described above, there will exist in reality positional excursion of the beam waist or light spot relative to the disc surface to the order of several $\mu m \times 10^{-1}$.

Thus, although the relationship between the beam waist and the data track such as shown in FIG. 5A is desirable for the data recording, the same does not apply to the case of the reproduction of the recorded information.

Accordingly, it is required to irradiate the data track with the light beam spot having a greater diameter than the width of the track as is illustrated in FIGS. 5B and 5C for the reproduction of the recorded information. However, when the relative position between the disc and the beam waist or spot is simply changed from the positional relationship shown in FIG. 5A, then the diameter of the light spot will be increased also in the longitudinal direction of the data track as illustrated in FIGS. 5B and 5C as the result of which the reproduction performance for the information recorded at high frequency, that is, information recorded with short wave length will be degraded, involving deterioration in the quality of the reproduced signal. The optical apparatus shown in FIG. 2 including the lens systems shown in FIG. 3 or 4 is arranged so as to prevent such a drawback. It should be recalled that the cylindrical lenses 7 and 8 are so arranged that the lens action thereof is exerted to the light beam impinging on the information or data track in the transverse direction thereof according to the teaching of the invention.

Figure 6:
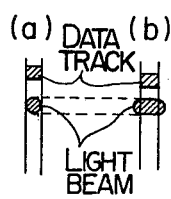
FIG. 6 shows sectional profiles of illuminating light beams projected onto an information track for recording and reproduction, respectively.

More specifically, through fine adjusting movement of the lens drum 14 including the cylindrical lenses along the optical axis relative to the concentrating lens system 10, the diameter of the reading light beam on the data track can be enlarged only in the transverse direction thereof, while the beam diameter is maintained unchanged in the longitudinal direction of the data track, whereby the light spot such as shown in FIG. 6 at b can be produced. Such fine adjustment of the lens drum 14 can be attained by energizing the solenoid 18 or 18', as described hereinbefore. The positional relationship between the beam waist or light spot and the data track shown at (a) in FIG. 6 is for recording information on the blank disc 1, and that shown at (b) in FIG. 6 is for reproducing recorded information.

In general, in the diode laser, multi-mode is likely to be produced in the direction parallel to the junction plane. However, the data track can be irradiated with a clear light beam in the longitudinal direction even when the multi-mode governs in the transverse direction of the data track. Even if the transverse mode becomes that in multi-mode, a recording and reproduction qualities can be assured to a satisfactory degree. In this manner, a stable tracking error signal of a high quality can be obtained without involving any substantial deterioration in the reproduction quality.

In the case of the embodiment described above, it has been assumed that both of the cylindrical lenses 7 and 8 are subjected to fine adjustment with the distance between both lenses being maintained constant. However, it is equally possible to adjust the position of only one cylindrical lens 7 or 8.

Figure 7:
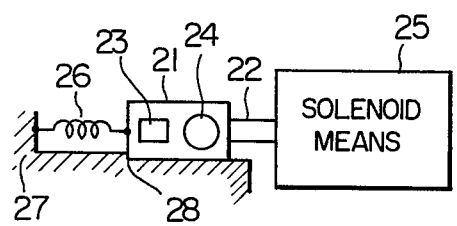
FIG. 7 shows schematically an apparatus for changing the sectional profile of an illuminating light beam.

FIG. 7 shows another exemplary embodiment of the optical apparatus according to the invention in which the cylindrical lenses are held stationary at the position to produce the circular constricted beam suited for the signal recording. Referring to FIG. 7, reference numeral 21 denotes a metallic fixture mounted fixedly on a plunger 22 and provided with an additional concave or convex cylindrical lens 23 having a relatively long focal distance and an aperture 24. Numeral 25 denotes a solenoid means for actuating the plunger 22, and numeral 26 denotes a tension spring for normally pulling the fixture 21 to the left at a limit position defined by step 28 formed in a stopper member 27. The assembly constituted by the above mentioned components is disposed in the light path between the condenser lens 6 and the concentrating lens 10 such that the light beam may pass through the aperture 24 without being scattered. When the solenoid 25 is electrically energized through actuation of the reproducing button switch, the plunger 22 is moved to the right as viewed in FIG. 7, whereby the additional cylindrical lens 23 is brought to the position which was previously occupied by the aperture 24. In this state, the face of the cylindrical lens 23 having the maximum curvature is positioned in the same direction as the cylindrical lenses 7 and 8 as described hereinbefore.

As will be appreciated from the foregoing description, the invention provides an optical apparatus using the combination of concave and convex cylindrical lenses to form a minute light beam of circular shape from elongated ellipsoidal light. The invention also provides an optical recording and play back system where, in the recording operation of the system, the recording medium is illuminated by a minute size, circular shape light spot, and in the play back operation of the system the recording medium is illuminated by a light spot expanded laterally only in the transverse direction of the data track, whereby a stable signal can be obtained for use in the tracking control of the system.

What is claimed is:

1. An optical system for optically recording or reproducing information on or from the information tracks of an optically sensitive recording medium by a light beam, comprising:
    a diode laser forming a light source, said laser having a junction plane and emitting a first light beam component in a direction perpendicular to a said junction plane and a second light beam component in a direction parallel to said junction plane;
    a condenser lens disposed in a light emission path of said diode laser for collecting the first and second light beam components emitted by said diode laser;
    a cylindrical lens assembly composed of at least a concave cylindrical lens and a convex cylindrical lens, each cylindrical lens having an axis of curvature in a direction perpendicular to said junction plane of said diode laser, said cylindrical lens assembly being disposed in succession to said condenser lens to receive the light output therefrom, and disposed such that only said second light beam component emitted from said laser undergoes optical treatment; and
    a concentrating lens for constricting said light beam components passing through said collecting lens and said cylindrical lens assembly, to produce a narrowly constricted light beam for projection onto said recording medium.

2. An optical system as set forth in claim 1, wherein said condenser lens and said cylindrical lenses are so arranged that said first and second light beam components are focused at a common point on an optical axis of said optical system in the form of magnified light images having substantially the same dimensions and having a substantially square or substantially circular form.

3. An optical system as set forth in claims 1 or 2, wherein said cylindrical lens assembly is movable along the optical axis to a first or second position depending on whether a recording or reproducing operation is to be performed, said second position, corresponding to a reproducing operation, causing the size of said light spot on said recording medium to be enlarged laterally in the transverse direction of a said information track relative to the dimension of said light spot in a transverse direction to said information track during a recording operation.

* * * * *